US012550839B2

(12) United States Patent
Roth et al.

(10) Patent No.: US 12,550,839 B2
(45) Date of Patent: Feb. 17, 2026

(54) DATA COLLECTION SYSTEM FOR IRRIGATION SYSTEMS

(71) Applicant: REINKE MANUFACTURING CO., INC., Deshler, NE (US)

(72) Inventors: Christopher Charles Roth, Deshler, NE (US); Russell Scott Reinke, Deshler, NE (US)

(73) Assignee: REINKE MANUFACTURING CO., INC., Deshler, NE (US)

( * ) Notice: Subject to any disclaimer, the term of this patent is extended or adjusted under 35 U.S.C. 154(b) by 811 days.

(21) Appl. No.: 17/237,415

(22) Filed: Apr. 22, 2021

(65) Prior Publication Data

US 2022/0338429 A1    Oct. 27, 2022

(51) Int. Cl.
| A01G 25/16 | (2006.01) |
| A01C 23/04 | (2006.01) |
| A01G 25/09 | (2006.01) |
| A01M 7/00 | (2006.01) |

(52) U.S. Cl.
CPC .......... *A01G 25/167* (2013.01); *A01C 23/042* (2013.01); *A01G 25/092* (2013.01); *A01M 7/0042* (2013.01); *A01M 7/0089* (2013.01)

(58) Field of Classification Search
CPC . A01M 7/0089; A01M 7/0042; A01C 23/042; A01G 25/092; A01G 25/167
USPC ....................................................... 239/728
See application file for complete search history.

(56) References Cited

U.S. PATENT DOCUMENTS

| 5,467,271 A * | 11/1995 | Abel | A01B 79/005 |
| | | | 702/5 |
| 5,487,702 A * | 1/1996 | Campbell | A01F 12/50 |
| | | | 460/7 |
| 5,539,637 A * | 7/1996 | Upchurch | A01G 25/16 |
| | | | 702/130 |
| 5,606,850 A * | 3/1997 | Nakamura | A01B 79/005 |
| | | | 111/911 |
| 5,884,224 A * | 3/1999 | McNabb | A01G 7/00 |
| | | | 700/284 |
| 8,317,114 B1 * | 11/2012 | Malsam | A01G 25/092 |
| | | | 239/729 |
| 2008/0251602 A1 * | 10/2008 | Leggett | A01G 25/167 |
| | | | 239/69 |

* cited by examiner

Primary Examiner — Chee-Chong Lee
(74) Attorney, Agent, or Firm — Shook Hardy & Bacon L.L.P.

(57) ABSTRACT

The technology described herein provides a dual machine irrigation system. The first machine is primarily an irrigation machine and the second machine is primarily a sensor machine, though it may also distribute liquids. The irrigation machine includes an irrigation span and can include multiple irrigation spans. The sensor machine includes a sensor span and can include multiple sensor spans. The sensor span gathers data that is used to optimize the liquid deployment from the irrigation span. In an aspect, both the irrigation span and the sensor span follow the same path of travel through a field, but at different times. The sensor span is separate from the irrigation span and includes a plurality of environmental sensors that gather data on the field, the field environment, and any crops that may be in the field. The ability of the sensor span to provide real-time data allows for optimization of liquid deployments.

19 Claims, 6 Drawing Sheets

DATA COLLECTION SYSTEM FOR IRRIGATION SYSTEMS

TECHNICAL FIELD

The present disclosure generally relates to irrigation equipment and, more particularly, to center pivot irrigation systems. The present disclosure further relates to systems and methods for optimizing an irrigation system's fluid distribution to fit observed crop conditions in a field.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to irrigation equipment, machines and/or systems. However, it will be understood and appreciated by those having ordinary skill in the art that embodiments of the disclosure are not limited to irrigation system applications and may be used in other applications where optimizing liquid distribution within a bounded area would be beneficial.

Mechanized irrigation systems provide the ability to manage water resources and, in some instances, other liquids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. Mechanized irrigation systems can include lateral move irrigation systems and center pivot. A center pivot arrangement includes a central pivot point about which the system rotates, swivels, or revolves. The central pivot point generally includes a rotational swivel and bearing assembly that supports a substantially horizontal, primary, irrigation pipeline having one or more spans. A span travels in a fixed circular operation in relation to the central pivot point. The path of travel is determined by the span's radial position with respect to the central pivot point. Hence, the particular area capable of being irrigated by a span can be ascertained through standard mathematical calculations known to those having ordinary skill in the art. This, in turn, permits optimal water capacity or distribution to be determined.

It can be a challenge to determine the correct amount of liquid (e.g., water, fertilizer) for the irrigation system to apply. The amount applied may be referred to as the application depth and can be derived from various methods. For example, agronomic formulas can be used by those familiar with the art to derive the soil-water balance through manual observations. An agronomist specializing in irrigation scheduling is a typical user of such algorithms and may even use a proprietary model to recommend how much and when to water. Experience and intuition also play a significant role in the manual recommendation.

It is common practice to determine when and how much to water to apply based on a manual process, known as the mud-ball method, to those familiar with the art. This is done by collecting a soil sample from the field and firmly compressing the sample within the palm. Whether water seeps from the soil sample or the soil sample falls apart when the hand is released can help determine when and how much to water. This method is highly subjective.

Another example uses soil sensors to infer volumetric water content (VWC). A specific VWC scale based on soil type exists to know how much water, by percent, is present underground at the sensing location based on the sensor reading. Another soil sensor technology is tensiometry and reads in centibars to measure the tension between the water and soil. High tension readings mean low water presence in the soil; thus, not as accessible to the crop rooting system.

Based on a USDA survey, there is a small percentage of farming operations using in-field soil sensing. There are some complexities and effort required by installing sensors and their removal. Advancements in soil sensing technology have addressed some of these decade-old challenges, but challenges remain. For example, recharging a battery powering a soil sensor and even retrieving data from the soil sensor can be time intensive.

In contrast to in-field sensing, remote sensing, or aerial-based imagery using a drone, fixed wing, or satellite providers, has also enabled irrigation scheduling solutions at varying accuracy levels. This is another example of data sensing apart from the irrigation equipment. The sensor data affects how the mechanized irrigation should be controlled. However, data provided by these methods can become outdated quickly. For example, a precipitation event can make sensor data taken even hours earlier outdated.

In these cases, the present-day solutions do not address a holistic approach or an all-in-one solution where data is gathered, processed, and used to effect change resulting in on-machine, not off-machine, practices toward optimizing irrigation control. There is still significant room for improvement in gathering real-time sensor data that can be used to control and optimize mechanized irrigation.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the technology described herein provide for a dual machine irrigation system. The first machine is an irrigation machine and the second machine is a sensor machine. The irrigation machine includes an irrigation span and can include multiple irrigation spans. The sensor machine includes a sensor span and can include multiple sensor spans. The irrigation span primarily deploys liquid to the field, while the sensor span primarily gathers data that is used to optimize the liquid deployment. In an aspect, the sensor span may be functional to deploy liquid to a field. Liquid may be deployed through the sensor span to augment liquid deployed by the irrigation span. Liquid deployed can include water, herbicides, pesticides, fungicides, and fertilizers.

In aspects, both the irrigation span and the sensor span may follow the same path of travel through a field, but at different times. For example, in the case of the central pivot irrigation span, both the sensor span and irrigation span can pivot about the center and have spans of the same length. This means that the wheels of a tower on the sensor span follow the same path as the wheels of a tower on a corresponding irrigation span. While corresponding sensor and irrigation spans may be the same length, the sensor machines and irrigation machines can be different lengths or the same length. For example, the sensor machine could include less spans than the corresponding irrigation machine or vice versa.

The irrigation span includes an irrigation pipeline with multiple sprinklers to deploy water onto a field. In addition to water, the irrigation span may deploy other liquids such as herbicides, insecticides, fertilizer, fungicides, and the like. The deployment of liquid through the irrigation span and other functions of the irrigation span may be controlled by a central controller. In aspects, the irrigation span may include no sensors. In another aspect, the irrigation span may include location sensors, but no environmental sensors. In another aspect, the irrigation span can include various environmental sensors, such as those installed on the sensor span.

The sensor span is separate from the irrigation span and includes a plurality of environmental sensors that gather data on the field, the field environment, and any crops that may be in the field. The sensors can include soil sensors, image sensors, electro chemical sensors, insect sensors, disease sensors, fungus sensors, mechanical sensors, dielectric soil-moisture sensors, and airflow sensors. The sensor span can include sensor interfaces that communicate with and/or recharge sensors installed in a field.

Sensor data is fed from the sensor span to a central controller. The central controller processes the sensor data to control liquid flow through the irrigation span. For example, the irrigation could be controlled to achieve a desired soil moisture level. In another example, the central controller could cause a selective herbicide to be deployed through the irrigation span to a portion of the field in response to images depicting weeds. In another example, the central controller could cause an insecticide to be deployed through the irrigation span in response to images depicting insect infestation or insect damage to crops.

The central controller includes a computing environment suitable to assess environmental and crop conditions from sensor data received from the irrigation span and adapt the deployment of liquid from the irrigation system to the environmental and crop conditions. The central controller may also receive data from other sources, such as local weather stations, satellite data, soil sensors, and the like. The central controller can use machine learning, heuristics, and other mechanisms to guide liquid deployment.

The irrigation span and sensor span may operate separately and may be controlled separately. For example, the sensor span may move more quickly through a field than the irrigation span while irrigation is ongoing. In an aspect, the sensor span may traverse the field multiple times while irrigation is ongoing. For a period, the sensor span may run ahead of the irrigation span to take sensor readings that will be used to control irrigation. For a second time period, the sensor span may shadow the irrigation span to determine if the irrigation is achieving the desired results in near real-time. In this way, the sensor span can provide result-based information that can be used to alter an irrigation plan or otherwise control irrigation. The ability of the sensor span to provide both prospective (i.e., before irrigation) and retrospective environmental (i.e., after irrigation) data allows for optimization of liquid deployments, which can maximize crop yields.

BRIEF DESCRIPTION OF THE DRAWINGS

Aspects of the disclosure are described in detail below with reference to the attached drawing figures, wherein.

DETAILED DESCRIPTION

Figure 1:
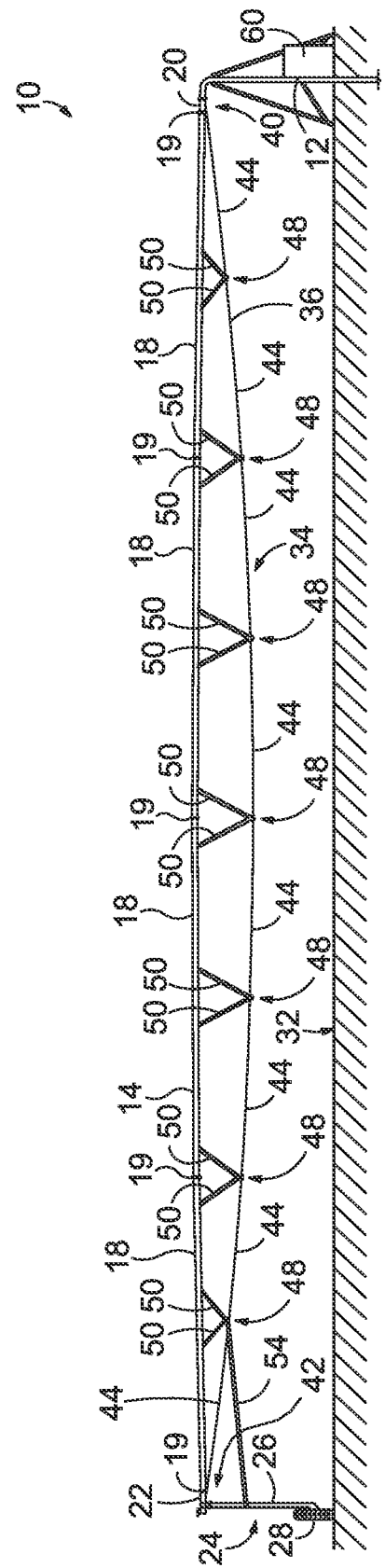
FIG. 1 is a schematic plan view of a center-pivot irrigation system with an ancillary span operating in a corner of a field in accordance with an embodiment of the present disclosure.

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide for a dual machine irrigation system. The first machine is an irrigation machine and the second machine is a sensor machine. The irrigation machine includes an irrigation span and can include multiple irrigation spans. The sensor machine includes a sensor span and can include multiple sensor spans. The irrigation span deploys liquid to the field, while the sensor span gathers data that is used to optimize the liquid deployment. In another embodiment, the sensor span can also deploy liquid, such as a chemical application (e.g., insecticide, fungicide, and herbicide) independently of the irrigation span.

Both the irrigation span and the sensor span have similar physical characteristics and construction. A "span," as the term is used herein, is a structural assembly comprised of at least a portion of the substantially horizontal, primary structural member (e.g., irrigation pipe), struts and braces, and a truss rod connection system. A span is bounded on either side by a support structure, such as a center station or tower. In a center-pivot irrigation system, a span travels in a fixed circular operation in relation to the central pivot point. The path of travel is determined by the span's radial position with respect to the central pivot point. In aspects, both the irrigation span and the sensor span follow the same path of travel through a field, but at different times. For example, in the case of the central pivot irrigation span, both the sensor span and irrigation span can pivot about the center and have spans of the same length. This means that the wheels of a tower on the sensor span would follow the same path as the wheels of a tower on a corresponding irrigation span. While corresponding sensor and irrigation spans may be the same length, the sensor machines and irrigation machines can be different lengths or the same length. For example, the sensor machine could include less spans than the corresponding irrigation machine or vice versa.

In aspects, mechanical and/or software anti-collision mechanisms can be deployed to prevent the co-location of an irrigation machine and a sensor machine in a field. The anti-collision mechanisms can enforce a buffer between the two machines. The software anti-collision mechanisms can include sensors that detect the location of both machines and then control the direction of travel and/or speed of travel to prevent a collision and enforce the buffer.

The irrigation span includes an irrigation pipeline with multiple sprinklers to deploy water onto a field. In addition to water, the irrigation span may deploy other liquids such as herbicides, insecticides, fertilizer, fungicides, and the like. The deployment of liquid through the irrigation span and other functions of the irrigation span may be controlled by a central controller. In aspects, the irrigation span may include no sensors. In another aspect, the irrigation span may include location sensors, but no environmental sensors. In another aspect, the irrigation span can include environmental sensors, such as those found on the sensor span.

The sensor span is separate from the irrigation span and includes a plurality of environmental sensors that gather data on the field, the field environment, and any crops that may be in the field. The sensors can include soil sensors, image sensors, electro chemical sensors, mechanical sensors, dielectric soil-moisture sensors, and airflow sensors. The sensor span can include sensor interfaces that communicate with and/or recharge sensors installed in a field. The sensor span can include power cables and communication cables. The power cables can supply power to the sensors and other components of the sensor span, such as electric motors providing wheel movement. The sensor cables can relay sensor data and other information between sensors and one or more controllers, such as a central controller. In an aspect, one or more sensors are wireless and are not connected to a sensor cable. If only wireless sensors are used in the sensor span, then communication cable is not required.

The sensor span can have the same physical structure as an irrigation span, including an irrigation pipeline. In aspects, the irrigation pipeline may simply be used as a structural component and may not include sprinklers or connection to a liquid source. In another aspect, the irrigation pipeline in a sensor span may be functional to deploy liquid to a field. Liquid may be deployed through the sensor span to augment liquid deployed by the irrigation span. Liquid deployed can include water, herbicides, pesticides, fungicides, and fertilizers. The sensors can be attached to a mechanical assembly that lowers the sensors into the ground or near the ground. The mechanical assembly can move along tracks that run the length of a span. This allows the same sensors to take readings at different points along a span. A single span can include multiple mechanical assemblies or just one.

Sensor data is fed from the sensor span to the central controller. The central controller processes the sensor data to control liquid flow through the irrigation span. For example, the irrigation could be controlled to achieve a desired soil moisture level. In another example, the central controller could cause a selective herbicide to be deployed through the irrigation span to a portion of the field in response to images depicting weeds. In another example, the central controller could cause an insecticide to be deployed through the irrigation span in response to images depicting insect infestation or insect damage to crops. Fungicides or other remedies could be deployed to treat corresponding problems.

The central controller includes a computing environment suitable to assess environmental and crop conditions from sensor data received from the irrigation span and adapt the deployment of liquid from the irrigation system to the environmental and crop conditions. The central controller may also receive data from other sources, such as local weather stations, satellite data, soil sensors, and the like. The central controller can use machine learning, heuristics, and other mechanisms to guide liquid deployment. In one aspect, the central controller runs autonomously without human intervention. In another aspect, the central controller runs autonomously without human intervention so long as liquid deployment parameters remain within bounded limits. When parameters exceed the bounded limits, authorization may be sought from an operator to control the irrigation system in a way that exceeds the bounded limits. For example, soil readings indicating drier soil than anticipated may require deployment of more water than is allowed within the bounded limits. In this case, the central controller can communicate with an operator via a user interface to seek authorization to deploy the additional water. Absent confirmation, the central controller may execute and default irrigation plan or deploy the maximum amount of water allowed via the bounded limits that define the central controller's autonomy.

The irrigation span and sensor span may operate separately. The irrigation span and sensor span may be controlled separately. For example, the sensor span may move more quickly through a field than the irrigation span while irrigation is ongoing. In an aspect, the sensor span may traverse the field multiple times while irrigation is ongoing. For a period, the sensor span may run ahead of the irrigation span to take sensor readings that will be used to control irrigation. For a second time period, the sensor span may shadow the irrigation span to determine if the irrigation is achieving the desired results in near real-time. In this way, the sensor span can provide result-based information that can be used to alter an irrigation plan or otherwise control irrigation. The ability of the sensor span to provide both prospective (i.e., before irrigation) and retrospective environmental (i.e., after irrigation) data allows for optimization of liquid deployments, which can maximize crop yields.

In addition to the dual machine system described above and elsewhere herein, embodiments of the technology described may include a single sensor machine without a separate irrigation machine. In the single machine embodiment, the sensor span may include all of the sensors described elsewhere as associated with sensor machines, such as sensor machine 220. The single sensor machine may not be capable of deploying liquids. The single sensor machine could take the form of a center pivot system or lateral move system and traverse a field while gathering data using the methods described herein. The single sensor machine may be deployed in fields that are not irrigated, such as with crops that may be dry farmed. Dry farmed crops can include potatoes, squash, grape, and olives. Fields that receive adequate precipitation may not need irrigation, but may benefit from a sensor machine.

Before describing the dual machine irrigation system in detail, an understanding of irrigation systems in general will be helpful. As set forth, in center pivot irrigation systems, the irrigation span moves in a fixed circular operation in relation to the center pivot point of the irrigation system. The irrigation span carries the main irrigation pipeline. The path of travel is determined by the radial position of the span relative to the central pivot point. Since the span is a structural assembly and it operates in a constant and known circular path.

Turning now to FIG. 1, an exemplary irrigation system 10 is described. The irrigation system 10 is an irrigation span of a center-pivot type irrigation system that revolves or rotates around a fluid source 12. Aspects of the technology are not limited for use with a center-pivot system. The irrigation system may be a linear or lateral-move irrigation system, or any other type of irrigation system.

The irrigation system 10 includes a pipeline 14 coupled to the fluid source 12. The pipeline 14 extends from the fluid source 12 to a tower 24. The pipeline 14 may comprise a plurality of pipe segments 18 coupled to one another, or to other segments, at pipe junctions 19. In other aspects, the pipeline 14 may comprise a single pipe segment. The pipeline 14 may include one or more different types of sprinklers for dispersing various applications on a field.

A first segment 20 of the pipeline 14 may connect to the fluid source 12 with a span coupling. The first segment 20 may include the span coupling, or a portion of the span coupling (e.g., a hook), for detachably coupling to the fluid source 12. The span coupling may comprise a hook-and-receiver-type span coupling. For example, the first segment 20 may include a hook that may be detachably coupled to a receiver (e.g., a ring) connected to the fluid source 12. Such a span coupling may provide a highly efficient point of rotation for the pipeline 14 when placed in the center of the pipeline 14.

In the illustrated aspect, the pipeline 14 is capped at a last segment 22. It may be advantageous in some aspects, however, to provide a multi-span irrigation system to permit irrigation of a greater area. For example, the irrigation system 10 may comprise a first span and a second irrigation system may comprise a second span, an ancillary span, or a swing arm that may be attached to the first span. Thus, the multi-span irrigation system may be composed of two or more irrigation systems (e.g., the irrigation system 10). In this example, the second span, ancillary span, or swing arm may be coupled to the last segment 22 of the pipeline 14 of the irrigation system 10 to increase the area over which the combined irrigation system travels. Thus, the last segment 22 of the pipeline 14 may include a span coupling (e.g., a hook and a receiver), or a portion of a span coupling, (e.g., a receiver) for connecting to a span coupling (e.g., a hook) of the second span, ancillary span, or swing arm. Hook-and-receiver-type span couplings are preferred, but other types of span couplings may also be useful with the present invention.

The tower 24 supports the last segment 22 of the pipeline 14. In other aspects, the tower 24 may support an intermediate portion of the pipeline 14 resulting in a portion of the pipeline 14 cantilevered past the tower 24. The tower 24 includes one or more support legs 26 and one or more wheels 28. In some aspects, the tower 24 is self-propelled and includes a drive unit that causes the wheels to rotate to carry the pipeline 14 over a field 32. In other aspects, other equipment (e.g., electronics) may be mounted on the tower 24, such as for controlling the drive unit.

Furthermore, the irrigation system 10 includes a control panel 60 for controlling operations of the irrigation system, such as by sending control signals to the drive unit on the tower 24 (e.g., to control speed), to a pump (e.g., to control flow rate), etc. The control panel 60 is illustrated affixed near the center pivot, and in other aspects, the control panel 60 may be affixed to other parts of the irrigation system 10. The control panel 60 may include a user interface (e.g., graphical user interface) for receiving inputs (e.g., application rate) from a user to control operations of the irrigation system 10. In other aspects, the control panel 60 may include a communications interface for sending and receiving signals (e.g., wireless signals or wired signals). As such, the control panel 60 may wirelessly receive user input remotely and may wirelessly send data (e.g., measured speeds, speed variance, etc.) to a remote location (e.g., server, user computing device, etc.). The control panel 60 may receive control instructions from a central controller, such as central controller 305 described subsequently. The central controller 305 may generate control instructions based on sensor data received from a sensor span.

A truss system 34 includes a first truss rail 36 and a second truss rail (obscured from view in FIG. 1 on the other side of the system 10). In some aspects, a truss system may include only one truss rail. In other aspects, the truss system may include more than two truss rails. The first truss rail 36 and the second truss rail are substantially similar and the following description of the first truss rail 36 applies equally to the second truss rail. A first end 40 of the first truss rail 36 is coupled to the first segment 20 of the pipeline 14. Likewise, a second end 42 of the first truss rail 36 is coupled to the last segment 22 of the pipeline 14. The first truss rail 36 includes a plurality of headed truss rods 44 coupled end-to-end between a pair of cooperating mating members at each of one or more intermediate joints 48.

The truss system 34 includes a plurality of pairs of struts 50 extending from the pipeline 14 with which they are coupled via conventional means (e.g., fastened to a plate that is welded to the pipeline 14). Each pair of struts 50 additionally is coupled to each other at one of the intermediate joints 48. The truss system 34 further includes a plurality of cross-members that are also obscured from view and that extend from one of the intermediate joints 48 of the first truss rail 36 to an intermediate joint of the second truss rail and spaces the intermediate joints, and thereby the first and second truss rails apart. In the illustrated embodiment, a brace 54 also extends from the tower 24 to one of the intermediate joints 48 to provide additional support and to stabilize the tower 24. In some aspects, one or more of the intermediate joints may comprise flying joints that do not have a strut 50, a cross-member 52, or a brace 54 attached. Thus, these flying joints include only adjacent truss rods 44 coupled end-to-end between the pair of cooperating members.

Using the control panel 60, a desired application rate may be set at the commencement of an irrigation cycle for a field or for one or more individual segments of a field. As mentioned, the control panel 60 can be controlled by a central controller. The application rate may then be used to determine a target speed. In some instances, this may be controlled by varying the duty cycle of the control signal that is sent to the last tower 24 on the irrigation system. For example, the last tower 24 is considered the control tower based on the mechanical and electromechanical functions. The command to this tower may be a sixty-second duty cycle where the duty can be adjusted based on the percentage timer setting where 100% is always on for the entire sixty-second cycle and 50% is thirty seconds on thirty seconds off. A command "on" signal engages the tower motor circuit propelling the system. When no command is signal is present the motor circuit is disengaged and the system movement ends. As such, adjusting duty cycle percentage directly correlates to the amount of applicant dispersed on the field of interest.

Figure 2:
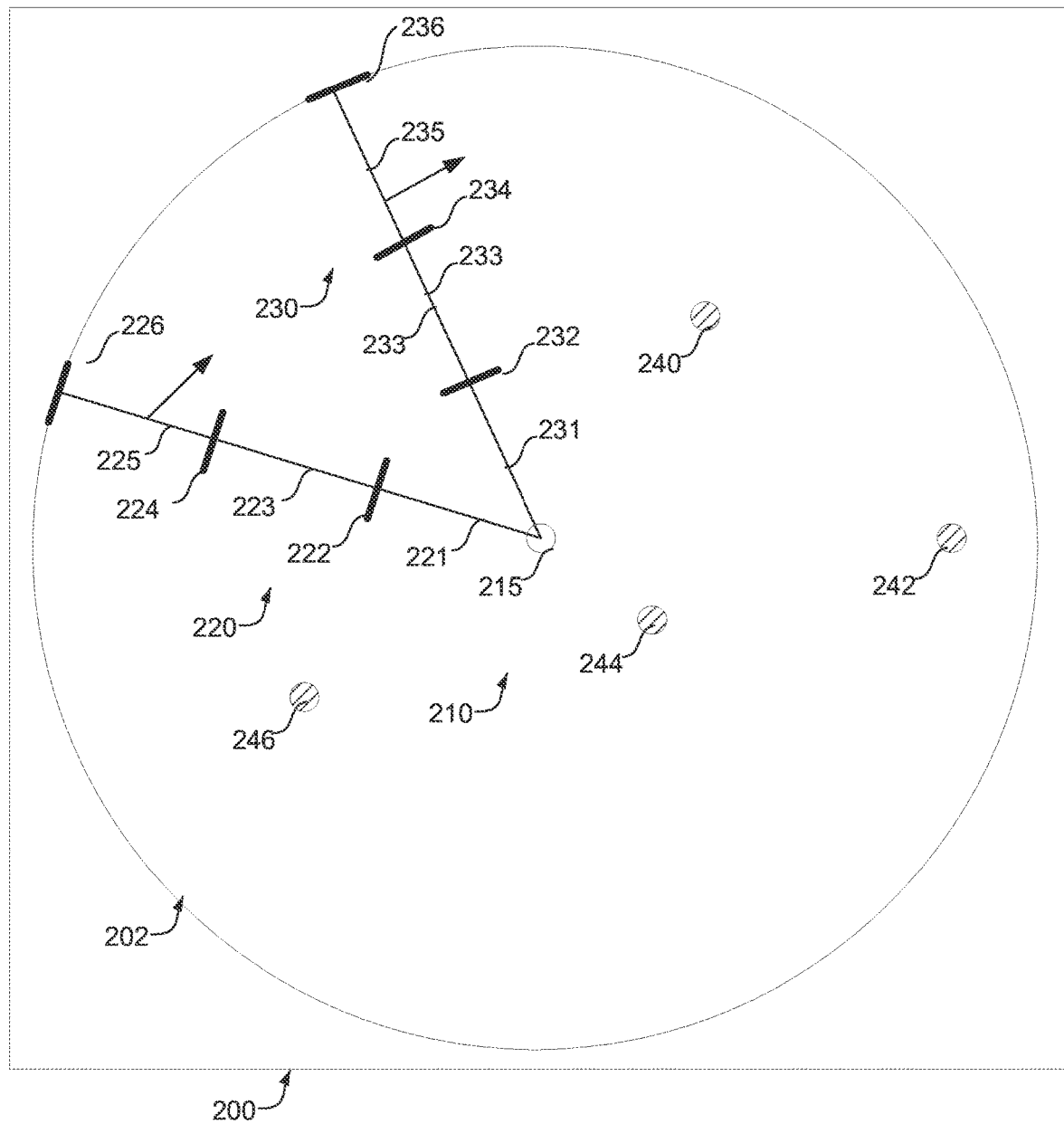
FIG. 2 is a view of a center-pivot irrigation system having an irrigation span and a sensor span in a leading position, in accordance with an embodiment of the disclosure.

Turning now to FIG. 2, a sensor machine in a leading position relative to an irrigation machine is shown in a field 200, in accordance with an aspect of the technology described herein. The center-pivot irrigation system 210 includes an irrigation machine 220 and a sensor machine 230. As indicated by the arrows, both machines are traversing the field in a clockwise direction. They may be moving at different speeds and may stop periodically. The sensor machine is located in a leading position and is able to gather prospective environmental conditions. Prospective environmental conditions are those present before liquid deployment. The prospective environmental conditions can be used to optimize the amount and type of liquid deployed.

The irrigation machine 220 includes three spans. Aspects of the technology are not limited to three spans or any particular number of spans. Nor are aspects limited use with center pivot irrigation systems. The first irrigation span 221 is connected to the center station 215 and first tower 222. The center station 215 may include a liquid connection to an irrigation pipe in the irrigation machine 220. The center station 215 may also include a separate structural support for the first irrigation span 221 to connect to. The second irrigation span 223 runs between the first tower 222 and the second tower 224. The third irrigation span 225 runs between the second tower 224 and third tower 226. Each span may include the components described previously with reference to FIG. 1. As irrigation machine 220 moves through the field 200, it will deploy liquid in accordance with instructions received from a controller that is responding to sensor information gathered by the sensor machine 230.

The sensor machine 230 includes three spans. The first sensor span 231 is connected to the center station 215 and fourth tower 232. As mentioned, the sensor machine 230 may not be connected to a liquid supply in some embodiments. The second sensor span 233 runs between the forth tower 232 and the fifth tower 234. The third sensor span 225 runs between the fifth tower 234 and sixth tower 236. Each span may include the components described previously with reference to FIG. 1. As sensor machine 230 moves through the field 200, it will take readings in accordance with instructions received from a controller. These instructions may be in accordance with a preliminary sensor plan that can be modified based on results of sensor readings.

Circle 202 illustrates the path followed by the wheels on the third tower 226. The wheels on the six tower 236 follow the same path. Likewise, the wheels on the second tower 224 follow the same path as the wheels on the fifth tower 234. The wheels on the first tower 222 follow the same path as the wheels on the fourth tower 232. These relationships illustrate a correspondence between a sensor span and irrigation span. Spans correspond when they cover the same area of a field, but not the same time. Thus, the first irrigation span corresponds to the first sensor span. The second irrigation span corresponds to the second sensor span. The third irrigation span corresponds to the third sensor span.

The sensor machine includes sensors and sensor interfaces. The sensors can be attached to moveable mechanical assemblies that lower the sensors into the ground or near the ground. The mechanical assemblies can move along tracks that run the length of a span. This allows the same sensors to take readings at different points along a span. A single span can include multiple mechanical assemblies or just one. The sensors can be on the same mechanical assembly or different mechanical assembly than the sensor interface. The sensor interfaces interact with in-field sensors.

The field also includes in-field sensors 240, 242, 244, 246. The sensor machine 230 may include one or more sensor interfaces. The sensor interfaces can communicate with the in-field sensors. For example, the sensor interfaces can receive sensor data from in-field sensors. The sensor interfaces can also include inductive charging mechanisms that allow the sensor interface to recharge an in-field sensor. In an aspect, the center machine stops while over an in-field sensor to allow charging and communication to take place. Other sensor readings may also be taken while the machine is stopped. The sensor interface may comprise a retractable charging component. For example, the center interface may deployed on a telescoping pole that extends downward from the sensor machine 230.

Figure 3:
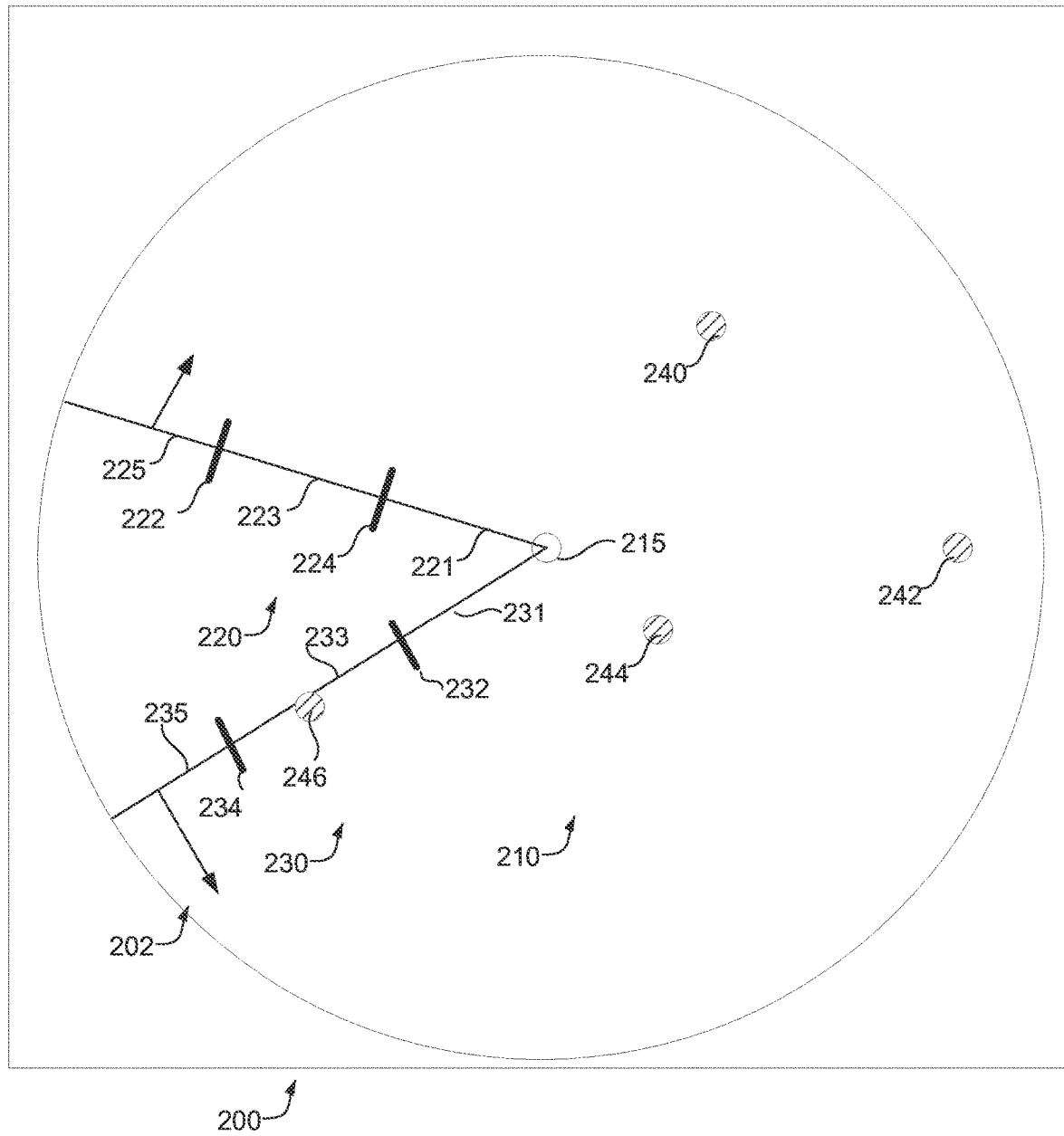
FIG. 3 is a view of a center-pivot irrigation system having an irrigation span and a sensor span in a trailing position, in accordance with an embodiment of the disclosure.

Turning now to FIG. 3, a sensor machine in a trailing position relative to an irrigation machine is shown in a field 200, in accordance with an aspect of the technology described herein. The center-pivot irrigation system 210 includes an irrigation machine 220 and a sensor machine 230, as described previously in FIG. 2. As indicated by the arrows, the machines are traversing the fields in different directions. The irrigation machine 220 traverses the field in a clockwise direction while the sensor machine 230 is traversing the field in a counterclockwise direction.

A trailing or leading position is not defined by the direction of travel, but by whether the sensor is in a part of the field that has already been irrigated during a current irrigation cycle. An irrigation cycle may be the complete 360 traversal of a field or otherwise the complete irrigation of the field (not all fields allow for 360 degrees of motion). In the example shown, the portion of the field where the sensor machine 230 is located has already been irrigated. For example, for the sake of illustration, the irrigation cycle could have started with the irrigation machine 220 oriented directly downward toward "6 o'clock." As the irrigation cycle progressed, the irrigation machine 220 reached its currently shown position. In this scenario, the sensor machine 230 is in a portion of the field already irrigated.

The sensor machine located in a trailing position is able to gather retrospective environmental conditions. Retrospective environmental conditions are those present after liquid deployment. The retrospective environmental conditions can be used to optimize the amount and type of liquid deployed. For example, the irrigation system may have a target soil-moisture content. The amount of water deployed can be calculated based on prospective measurements. The retroactive measurements help confirm that the calculation of water needed was correct. If the target moisture content is not being met, then the amount of liquid deployed can be increased or decreased accordingly.

Figure 4:
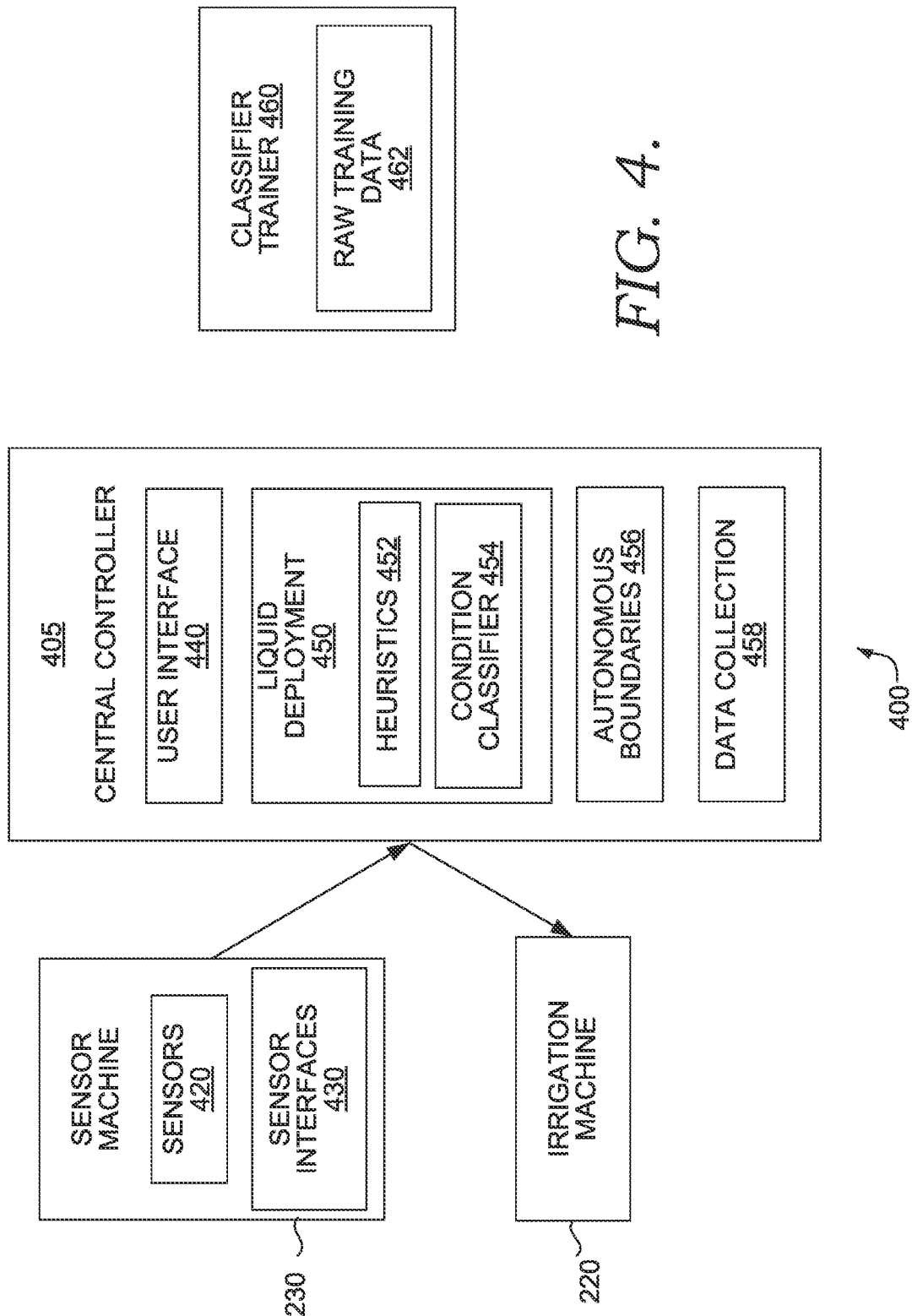
FIG. 4 is a computing system diagram showing an irrigation controller, in accordance with an embodiment of the disclosure.

Referring now to FIG. 4, a block diagram is provided showing aspects of an example computing system architecture suitable for implementing an aspect of the technology and designated generally as system 400. System 400 represents only one example of a suitable computing system architecture. Other arrangements and elements can be used in addition to or instead of those shown, and some elements may be omitted altogether for the sake of clarity. Many of the elements described herein are functional entities that may be implemented as discrete or distributed components or in conjunction with other components, and in any suitable combination and location.

At a high level, system 400 comprises a sensor machine 230 and an irrigation machine 220. The sensor machine 230 communicates sensor data to the central controller 405. The central controller 405 processes the sensor data and generates irrigation instructions that are communicated to the irrigation machine 220. The central controller 405 could be located near the irrigation system, such as near the center of the irrigation system. However, the central controller 405 could also be located remotely, such as in a data center, and communicatively coupled to controllers for the irrigation machine 220 and the sensor machine 230 via the Internet.

Example system 400 includes the central controller 405 (including its components 440, 450, 452, 454, and 456) and classifier trainer 460. The central controller 405 (and its components) and classifier trainer 460 (and its components) may be embodied as a set of compiled computer instructions or functions, program modules, computer software services, or an arrangement of processes carried out on one or more computer systems, such as computing device 500 described in connection to FIG. 5, for example.

In one aspect, the functions performed by components of system 500 are associated with one or more personal assistant applications, browsers, services, or routines. In particular, such applications, services, or routines may operate on one or more user devices servers, may be distributed across one or more user devices and servers, or be implemented in the cloud. Moreover, in some aspects, these components of system 500 may be distributed across a network, including one or more servers and client devices, in the cloud, or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein concerning specific components shown in example system 500, it is contemplated that in some aspects, functionality of these components can be shared or distributed across other components.

The mechanical aspects of sensor machine 230 have been described previously, at least with reference to FIGS. 1-3. For the purpose of system 400, the sensor machine 230 includes a plurality of sensors 420 and one or more sensor interfaces 430. The plurality of sensors can include location sensors and environmental sensors.

The location sensors provide information about the location of the sensor machine in the world and/or in a field. For example, GPS sensors could be used to identify a location of the sensor within the world. As the location of the field in the world may be known, the worldwide location of the sensor can be used to place the sensor in a portion of the field. Other location sensors could determine a location relative to the center pivot or some other component. For example, a sensor may measure a rotation of the sensor span or irrigation span through the field and use this information to determine the location of the sensor machine in the field. The location information can be used to determine where an identified environmental condition exists. The environmental data may be correlated with location data. For example, an environmental sensor data record may comprise environmental sensor data, a timestamp, a sensor ID, and a location of the sensor machine. The relative locations of the sensor associated with the senor ID and a location sensor that generated the location data may be used to accurately associate the environmental sensor data with a location in the field.

The environmental sensors may include soil sensors, image sensors, electro chemical sensors, mechanical sensors, dielectric soil-moisture sensors, and airflow sensors. The soil sensors may include optical sensors. Optical sensors use light to measure soil properties. The sensors measure different frequencies of light reflectance in near-infrared, mid-infrared, and polarized light spectrums. Soil reflectance and plant color data are just two variables from optical sensors that can be aggregated and processed. Optical sensors may determine amounts of moisture content of the soil along with other properties.

Mechanical sensors measure soil compaction or "mechanical resistance." The sensors use a probe that penetrates the soil and records resistive forces through use of load cells or strain gauges. In one aspect, mechanical sensors can be mounted on the sensor span and telescope downward periodically to take a measurement. The movement of the sensor span may be stopped while the measurement is made.

Electrochemical Sensors can measure pH and soil nutrient levels. Sensor electrodes work by detecting specific ions in the soil. The electrochemical sensors can telescope into the soil on the same or different mechanical apparatus used by the mechanical sensors.

Dielectric soil-moisture sensors assess moisture levels by measuring the dielectric constant (an electrical property that changes depending on the amount of moisture present) in the soil. The soil moisture sensors can telescope into the soil on the same or different mechanical apparatus used by the mechanical sensors.

Airflow sensors measure soil air permeability. The desired output is the pressure required to push a predetermined amount of air into the ground at a prescribed depth. Various types of soil properties, including compaction, structure, soil type, and moisture level, produce unique identifying signatures. The airflow sensors can telescope into the soil on the same or different mechanical apparatus used by the mechanical sensors.

Weather sensors, such as temperature and humidity sensors, may be included on the sensor machine 230.

Image sensors capture images of the field and crops for classifying the health of the crop. The image sensors can be paired with lights oriented to illuminate all or a portion of the camera's field of view. Images can be processed to detect weeds, insects, fungus, and other crop diseases.

The sensor interfaces interact with in-field sensors (not shown). The sensor interfaces can telescope down from the sensor machine. The sensor interfaces may be located on a track that allows them to move along the length of a span. In this way, the same sensor interface can interact with in-field sensors located at different distances from the center pivot. The interactions between the interface sensor and the in-field sensor can include exchanging communications and providing power to the in-field sensor. In one aspect, the in-field sensor is recharged through inductive charging. Inductive charging (also known as wireless charging or cordless charging) is a type of wireless power transfer. It uses electromagnetic induction to provide electricity to in-field sensors. The exchange of information can be through a near field wireless connection (e.g., Bluetooth) or some other type of wireless connection. In aspects, the in-field sensor gathers and stores sensor readings for a period of time. The stored sensor readings are uploaded to the central controller 405 via the sensor interfaces 430. The sensor machine 230 may stop for a period of time while the sensor interface interacts with infield sensor. Other movements that either require (or are best performed with) the sensor machine stopped may be performed simultaneously.

The central controller 405 processes sensor data from the sensor machine 230 and generates instructions for the irrigation machine 220 and/or the sensor machine 230. The instructions can include liquid deployment instructions, but can also include data-gathering instructions for the sensor machine 230. The liquid deployment instructions can include the amount and type of liquid deployed by the irrigation machine. The data-gathering instructions can be based on a prearranged pattern. For example, the sensor machine may take prospective readings ahead of the irrigation span for a few hours and then traverse the field to a location trailing the irrigation span to take retrospective readings for a few hours. The data-gathering instructions can also be generated in response to detected environmental conditions. In an embodiment, the central controller 405 is cloud based and the sensor data may be processed remotely then instructions are transmitted to the system through common communication interfaces.

The user interface for 440 enables an operator to interact with the central controller 405. The operator may provide the central controller 405 an initial irrigation plan, an initial sensing plan, and various autonomous boundaries 456. The autonomous boundaries can establish an amount of deviation from an initial irrigation plan that is allowed based on real-time sensor data collected from the sensor machine 230. The autonomous boundaries may set a limit, such as 10%, 20%, or 30% above or below, the initial plan amount. For example, soil sensing may indicate that the soil is drier than anticipated thus requiring more water than called for by the initial irrigation plan in order to meet a soil moisture objective. If soil conditions call for more water than the established boundary then an alert may be sent to an operator who can authorize or deny permission to operate outside of the autonomous boundaries. Different autonomous boundaries can be established for different liquids.

The user interface 440 can also provide a summary of the completed irrigation or irrigation completed to date. The user interface 440 can also generate various visualizations of environmental conditions sensed in the field. For example, a heat map could be generated showing soil moisture conditions, compaction, or the like. The user interface 440 could overlay indications of various crop unhealthy conditions detected by the sensors. Other visualizations and communication of sensor data and irrigation data are possible.

Heuristics 452 include rules that are followed in order to operate the sensor machine 230 and/or the irrigation machine 220. For example, a rule could be followed to hit a target soil-moisture content in response to a measured soil moisture content. The target soil-moisture content can be provided by an operator through the user interface 440. The heuristics can calculate the amount of water needed in order to hit the target content and provide these instructions to the irrigation machine 220. Heuristics can be used in combination with the condition classifier 454. The condition classifier may analyze image data or other sensor data gathered by the sensor machine 230 and identify a condition, such as an insect infestation or fungus. In response to the detected condition, a heuristic may trigger a desired response by the irrigation machine 220. For example, in response to a particular type of insect infestation a particular amount of a particular type of insecticide may be deployed to a location in the field where were the infestation is detected.

As mentioned, the classifier 456 can take sensor data as an input and determine a condition present in the field. For example, image data in combination with soil moisture data can be used to classify a particular crop as healthy or unhealthy. If unhealthy, a possible cause of the unhealthy crop may be identified. For example, the visual appearance of the crop caused by a fungus may be different from the visual appearance of the crop caused by an insect infestation. Different funguses and different insects may cause crop damage having a different appearance. The classifier 456 can take the form of various architectures, such as a convolutional neural network. The classifier 456 can take the form of multiple single-purpose classifiers. For example, a single purpose classifier could be trained to identify weeds, while a different single purpose classifier is trained to identify insect damage. Either way, the end result produced by the classifier 456 is identified condition. The identified condition may be stored in the data collection component 458 along with any sensor data received.

Before the classifier 454 can classify a condition, it may be trained by the classifier trainer 460. Initially, the classifier 454 can have a neural network architecture with randomly initiated parameters, but not be able to classify crop conditions accurately. The classifier trainer 460 takes the raw training data instances in training data 462, which comprise sensor data and corresponding labels as input. For example, the raw training data 462 could comprise images depicting insect damage and a label of inspect damage. These images are used to build a trained condition classifier 454 through backpropagation or some other training mechanism. Once trained, the classifier 454 can classify unlabeled images or other sensor data.

Layers in the classifier 454 comprise neurons. The input layer neurons receive sensor data or a derivative of sensor data (e.g., a feature vector, embedding) and pass data derived from the sensor data to neurons in multiple hidden layers. Neurons in the hidden layers pass on the results of their computations to the additional layer, until the results get to the output layer. The output layer then produces probability values for each individual segment classification. Different types of layers and networks connect neurons in different ways.

Neurons have an intrinsic activation function that computes its output given an input (a vector of numbers) that is multiplied by another vector of numbers (called weights). The weights are the adjustable parameters that cause a neural network to produce a correct output given previous known matches between input-output. For example, if the training image was labeled healthy corn then the correct output is to classify the image as healthy. The weights are adjusted during training. Once trained, the weight associated with a given neuron can remain fixed. The other data passing between neurons can change in response to a given input (e.g., sensor data from the sensor span). Retraining the network with additional training data can update one or more weights in one or more neurons.

In each type of deep model, training is used to fit the model output to the training data. In particular, weights associated with each neuron in the model can be updated through training. Originally, the model can comprise random weight values that are adjusted during training. Training in this context is done in multiple iterations, and each iterations comprises multiple steps: forward pass, a loss function calculation and backpropagation, where the weights are updated given mistakes made by the neural network during training. This process is repeated for multiple batches of training images. The goal is to update the weights of each neuron (or other model component) to cause the model to produce an output that maps to the correct label for as often as possible. The training data comprises labeled sensor data (e.g., images). Each labeled sensor data is input to the model and used to train it. Once a sufficient number of training instances are fed to the model used by classifier 454 and the model stops improving or improves slowly during training, then the training can stop. The model can then be used to classify unlabeled images (e.g., not training documents) or other sensor data.

An Artificial Neural Network (ANN) is a computing processing module in hardware or software that is inspired by elements similar to those found in a biological neuron. For example, a variable input vector of length N scalar elements v1, v2, . . . vN are weighted by corresponding weights wi, and to an additional bias b0, and passed through hard or soft nonlinearity function h( ) to produce an output. In an aspect, the nonlinearity is for example a sign function, a tanh function, a function that limits the maximum and/or minimum value to a programmable output, or a ReLU function. An ANN may produce output equal to h (v1*w1+ v2*w2+ . . . +vN*wN+b0). Such networks "learn" based on the inputs and on a weight adjustment method. Weights may be adjusted iteratively based on evaluating the ANN over a data set while modifying the weights in accord with a learning object. One or more classification techniques may be used, such as gradient boosted decision tree binary classification. In an aspect, decision trees may be used as classifiers since decision trees may be easier to visualize and integrate into practical solutions.

A Convolutional Neural Network (CNN) is an ANN that performs operations using convolution operations, often for image data. A CNN may have several layers of networks that are stacked to reflect higher-level neuron processing. A layer is a set of adjacent neurons that have a small and adjacent receptive field. In an aspect, the number of network layers may be defined within a CNN component, such as 6-layers, 16-layers, 19-layers or 38-layers. A CNN Neuron's may be fully connected or partially connected to a succeeding layer. One or more layers may be skipped in providing a neuron output to a higher layer. The convolutions may be performed with the same resolution as the input, or a data reduction may occur with the use of a stride different from 1. The output of a layer may be reduced in resolution through a pooling layer. A CNN may be composed of several adjacent neurons, which only process inputs in a receptive field that is much smaller than the entire image. Examples of CNN components include ZF Net, AlexNet, GoogLeNet, LeNet, VGGNet, VGG, ResNet, DenseNet, etc.

A Corpus is a collection of data samples of the same kind. For example, a corpus of environmental data associated with crops for some period monitored by a sensor span.

A norm is a generally positive length measure over a vector space. In an aspect, a norm comprises a seminorm. A 2-norm is the square root of the sum of the squares of the elements (2-norm). A 1-norm is the sum of the absolute values of the vector elements. A p-norm is a quantity raised to the 1/p power that includes a sum of the absolute values of the vector elements, wherein each absolute value of an element is raised to the p power. An infinity norm is the max over the vector elements of the absolute value of each vector element.

A Residual Neural Network is an ANN that feeds neural output to a layer beyond the adjacent layer, skipping one or more layers, so that the receiving layer forms a result that includes the neural input from a non-adjacent layer.

Figure 5:
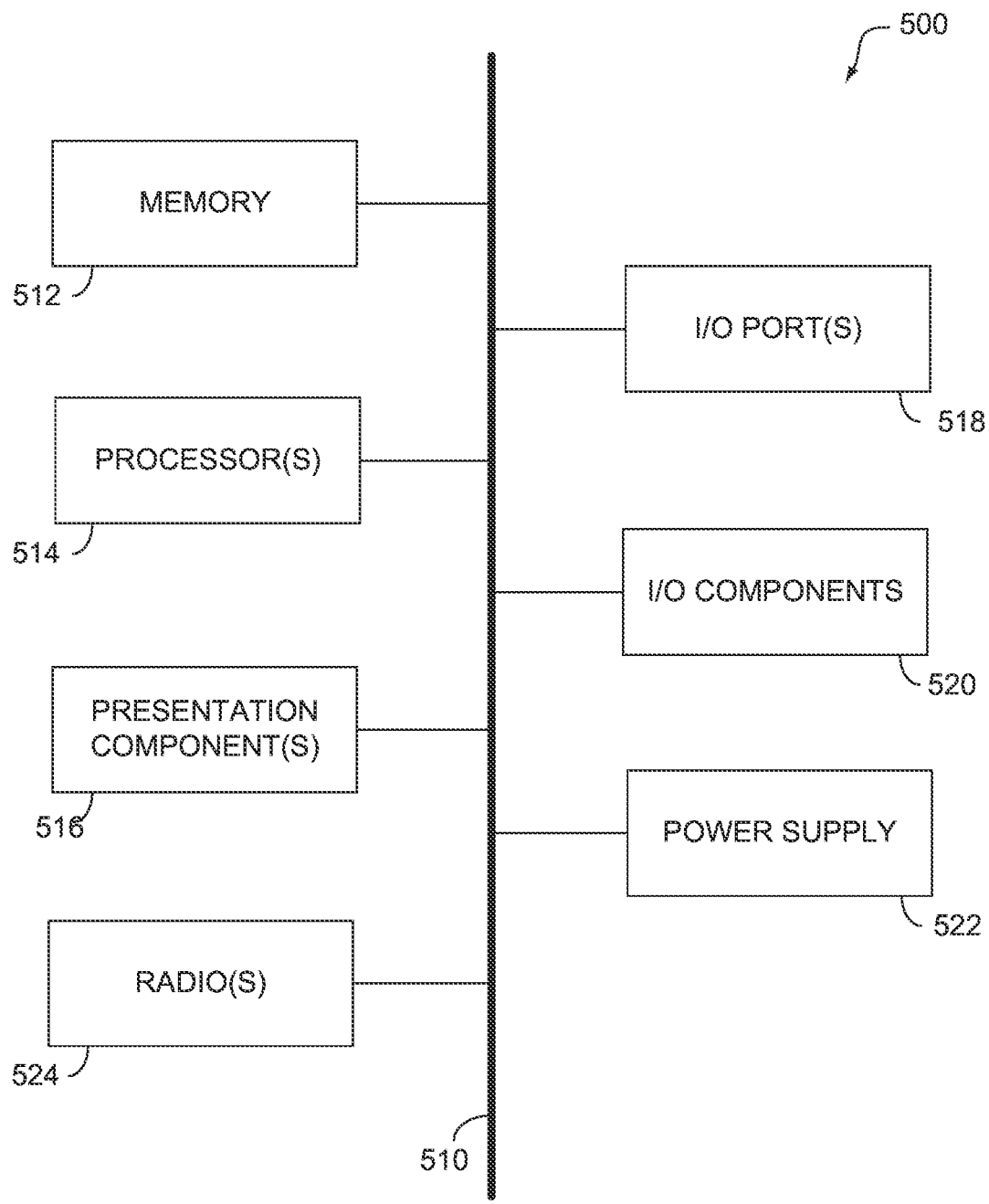
FIG. 5 is a computing system diagram showing an exemplary computing device, in accordance with an embodiment of the disclosure.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more aspects of the present technology. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc.

The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some aspects of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Figure 6:
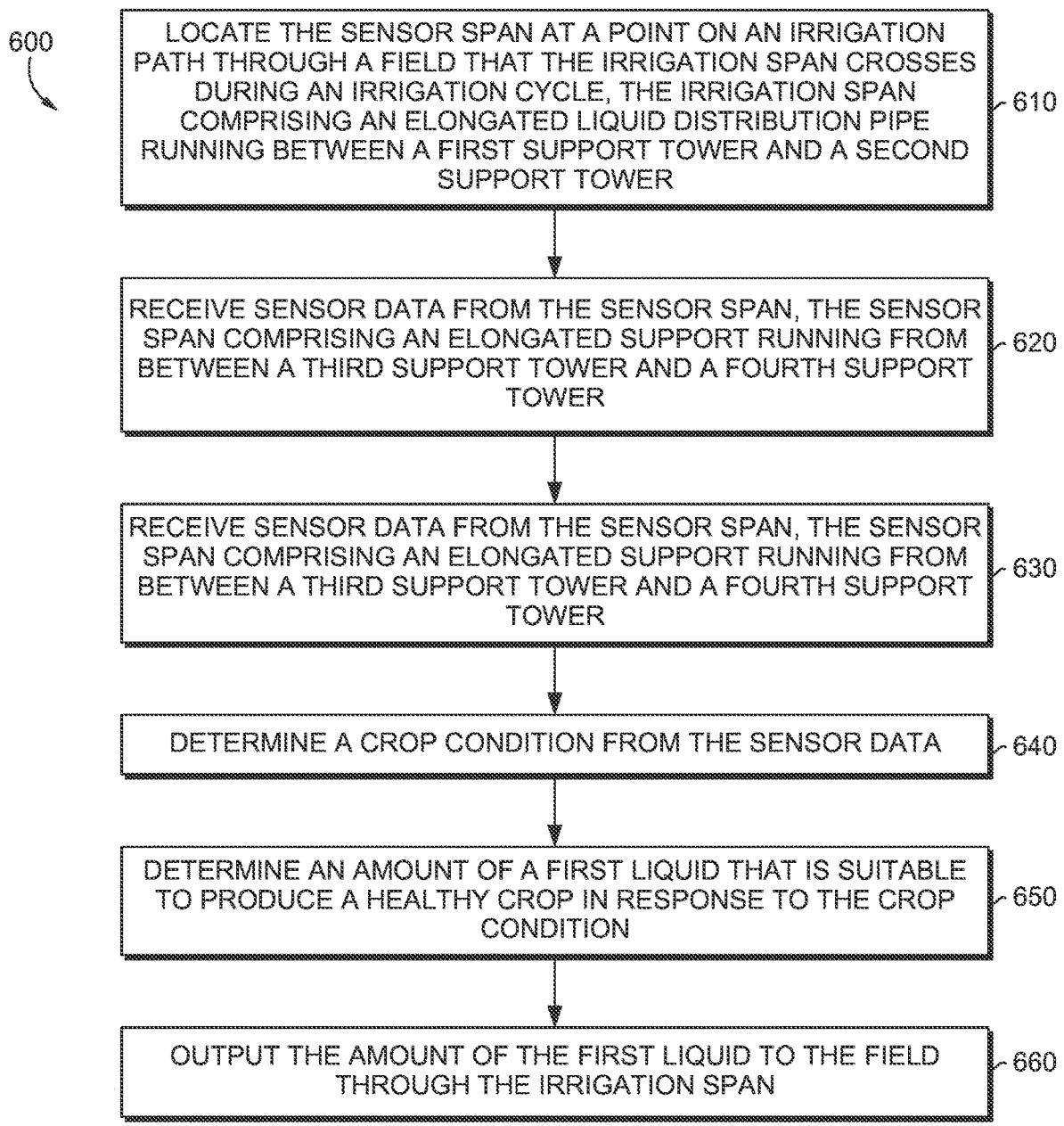
FIG. 6 is a flow diagram of a method of determining an optimal irrigation plan for a sector to be irrigated by an ancillary span of an irrigation system, in accordance with an embodiment of the disclosure.

Turning now to FIG. 6, a method 600 of controlling liquid flow through an irrigation system having an irrigation span and an irrigation span. The irrigation system may be similar to those described previously with reference to FIGS. 1-4.

At step 610, the method includes locating the sensor span at a point on an irrigation path through a field that the irrigation span crosses during an irrigation cycle, the irrigation span comprising an elongated liquid distribution pipe running between a first support tower and a second support tower. A span is bounded on either side by a support structure, such as a center station or tower. In a center pivot irrigation system, a span travels in a fixed circular operation in relation to the central pivot point. The path of travel is determined by the span's radial position with respect to the central pivot point. In aspects, both the irrigation span and the sensor span follow the same path of travel through a field, but at different times. For example, in the case of the central pivot irrigation span, both the sensor span and irrigation span can pivot about the center and have spans of the same length. This means that the wheels of a tower on the sensor span would follow the same path as the wheels of a tower on a corresponding irrigation span. In another embodiment, the sensor span and irrigation spans have different lengths and follow different paths.

The irrigation span includes an irrigation pipeline with multiple sprinklers to deploy water onto a field. In addition to water, the irrigation span may deploy other liquids such as herbicides, insecticides, fertilizer, fungicides, and the like. The deployment of liquid through the irrigation span and other functions of the irrigation span may be controlled by a central controller. In aspects, the irrigation span may include no sensors. In another aspect, the irrigation span may include location sensors, but no environmental sensors. In another aspect, the irrigation span can include environmental sensors, such as those found on the sensor span.

In aspects, mechanical and/or software anti-collision mechanisms can be deployed to prevent the co-location of an irrigation machine and a sensor machine in a field. The anti-collision mechanisms can enforce a buffer between the two machines. The software anti-collision mechanisms can include sensors that detect the location of both machines and then control the direction of travel and/or speed of travel to prevent a collision and enforce the buffer.

At step 620, the method includes receiving sensor data from the sensor span, the sensor span comprising an elongated support running from between a third support tower and a fourth support tower. The sensor span is separate from the irrigation span and includes a plurality of environmental sensors that gather data on the field, the field environment, and any crops that may be in the field. The sensors may include soil sensors, image sensors, electro chemical sensors, mechanical sensors, dielectric soil-moisture sensors, and airflow sensors. The sensor span may include sensor interfaces that communicate with and/or recharge sensors installed in a field. The sensor span can include power cables and communication cables. The power cables can supply power to the sensors and other components of the sensor span, such as electric motors providing wheel movement. The sensor cables can relay sensor data and other information between sensors and one or more controllers, such as a central controller. In an aspect, one or more sensors are wireless and are not connected to a sensor cable. If only wireless sensors are used in the sensor span, then communication cable is not required.

The sensor span can have the same physical structure as an irrigation span, including an irrigation pipeline. In aspects, the irrigation pipeline may simply be used as a structural component and may not include sprinklers or connection to a liquid source. In another aspect, the irrigation pipeline in a sensor span may be functional to deploy liquid to a field. Liquid may be deployed through the sensor span to augment liquid deployed by the irrigation span. Liquid deployed can include water, herbicides, pesticides, fungicides, and fertilizers. The sensors can be attached to moveable mechanical assemblies that lower the sensors into the ground or near the ground. The mechanical assemblies can move along tracks that run the length of a span. This allows the same sensors to take readings at different points along a span. A single span can include multiple mechanical assemblies or just one.

Sensor data is fed from the sensor span to the central controller. The central controller processes the sensor data to control liquid flow through the irrigation span. For example, the irrigation could be controlled to achieve a desired soil moisture level. In another example, the central controller could cause a selective herbicide to be deployed through the irrigation span to a portion of the field in response to images depicting weeds. In another example, the central controller could cause an insecticide to be deployed through the irrigation span in response to images depicting insect infestation or insect damage to crops.

At step 630, the method includes determining a crop condition from the sensor data. The central controller includes a computing environment suitable to assess environmental and crop conditions from sensor data received from the irrigation span and adapt the deployment of liquid from the irrigation system to the environmental and crop conditions. The central controller may also receive data from other sources, such as local weather stations, satellite data, soil sensors, and the like. The central controller can use machine learning, heuristics, and other mechanisms to guide liquid deployment. In one aspect, the central controller runs autonomously without human intervention. In another aspect, the central controller runs autonomously without human intervention so long as liquid deployment parameters remain within bounded limits. When parameters exceed the bounded limits, authorization may be sought from an operator to control the irrigation system in a way that exceeds the bounded limits. For example, soil readings indicating drier soil than anticipated may require deployment of more water than is allowed within the bounded limits. In this case, the central controller can communicate with an operator via a user interface to seek authorization to deploy the additional water. Absent confirmation, the central controller may execute and default irrigation plan or deploy the maximum amount of water allowed via the bounded limits that define the central controller's autonomy.

At step 640, the method includes determining an amount of a first liquid that is suitable to produce a healthy crop in response to the crop condition. For example, the amount water deployed could be based on a target soil moisture and a soil moisture reading.

At step 650, the method includes outputting the amount of the first liquid to the field through the irrigation span. The instruction can be output through an application program interface.

Additionally, although some exemplary implementations of the embodiments described herein are shown in the accompanying figures, these implementations are not intended to be limiting. Rather, it should be understood that the various embodiments and aspects described herein may be implemented upon any number of irrigation systems. It is within the scope of the present disclosure that the above principals could be equally applied in other settings.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

Aspects of the disclosure have been described to be illustrative rather than restrictive. It will be understood that certain features and sub-combinations are of utility and may be employed without reference to other features and sub-combinations. This is contemplated by and is within the scope of the claims.

What is claimed is:

1. A center-pivot irrigation system comprising:
   an irrigation machine;
   a sensor machine;
   a center station connected to the irrigation machine and the sensor machine;
   the irrigation machine comprising an elongated liquid distribution pipe running from the center station to a first support tower of the irrigation machine, wherein the first support tower comprises a first set of wheels, wherein the irrigation machine is configured to provide liquid to a first portion of a field during an irrigation cycle;
   the sensor machine comprising an elongated support running from the center station to a second support tower, wherein a soil moisture sensor is coupled to the support, wherein the second support tower comprises a second set of wheels,
   wherein the sensor machine is located outside of the first portion of the field and the soil moisture sensor collects prospective signal data describing soil moisture for soil outside of the first portion of the field prior to liquid deployment from the irrigation machine;
   an irrigation control system programmed to receive the prospective signal data from the soil moisture sensor and use the prospective signal data to control an amount of water output through the irrigation machine; and
   an anti-collision controller to enforce a buffer between the irrigation machine and the sensor machine, wherein the buffer is maintained, at least, between the first set of wheels and the second set of wheels.

2. The center-pivot irrigation system of claim 1, wherein the first support tower and the second support tower are equal distance from the center station.

3. The center-pivot irrigation system of claim 1, wherein the first set of wheels on the first support tower and the second set of wheels on the second support tower run in a single path when traversing the center station.

4. The center-pivot irrigation system of claim 1, wherein the irrigation machine and the sensor machine are configured to move at different velocities.

5. The center-pivot irrigation system of claim 1, wherein the sensor machine comprises an image sensor, and the irrigation control system is programmed to receive signal data from the image sensor, determine a crop condition from the image sensor, and, in response to the crop condition, control an amount of treatment liquid output through the irrigation machine.

6. The center-pivot irrigation system of claim 5, wherein the treatment liquid is selected from the group comprising herbicide, fertilizer, fungicide, and insecticide.

7. The center-pivot irrigation system of claim 1, wherein the sensor machine comprises a probe operable to recharge in-field moisture sensors.

8. The center-pivot irrigation system of claim 1, wherein the center station comprises a swiveling center through which liquid flows into the elongated liquid distribution pipe.

9. An irrigation system comprising:
   an irrigation machine;
   a sensor machine;
   the irrigation machine comprising an elongated liquid distribution pipe running between a first support tower of the irrigation machine and a second support tower of the irrigation machine, wherein the first support tower comprises a first set of wheels, wherein the irrigation machine is configured to provide liquid to a first portion of a field during an irrigation cycle;

the sensor machine comprising an elongated support running from between a third support tower and a fourth support tower, wherein a soil moisture sensor is coupled to the support wherein the third support tower comprises a third set of wheels, wherein the sensor machine is positioned in a second portion of the field outside of the first portion of the field that has already been irrigated by the irrigation machine during the irrigation cycle, and the soil moisture sensor collects retrospective signal data describing soil moisture for soil in the second portion of the field after liquid deployment by the irrigation machine;

an irrigation control system programmed to receive the retrospective signal data from the soil moisture sensor and use the retrospective signal data to control an amount of water output through the irrigation machine; and an anti-collision controller, wherein the anti-collision controller prevents co-location of the irrigation machine and the sensor machine including, at least, preventing co-location of the first set of wheels and the third set of wheels.

10. The irrigation system of claim 9, further comprising a center station connected to the irrigation machine and the sensor machine.

11. The irrigation system of claim 9, wherein the first set of wheels on the first support tower and the third set of wheels on the third support tower run in a single path when traveling through a field.

12. The irrigation system of claim 9, wherein the sensor machine comprises a probe operable to recharge in-field moisture sensors.

13. The irrigation system of claim 9, wherein the sensor machine comprises an image sensor, and the irrigation control system is programmed to receive signal data from the image sensor, determine a condition of a crop from the image sensor, and, in response to the crop condition, control an amount of treatment liquid applied to the crop.

14. The irrigation system of claim 9, wherein the sensor machine is configured to follow the irrigation machine and collect information indicating a crop response to an irrigation plan executed by the irrigation machine.

15. The irrigation system of claim 9, wherein the sensor machine is configured to move at a first velocity that is greater than a second velocity at which the irrigation machine is configured to move.

16. A method of controlling liquid flow through an irrigation system as recited in claim 1 having an irrigation span and a sensor span, the method comprising:

locating the sensor span at a point on an irrigation path through a field that the irrigation span crosses during an irrigation cycle, the irrigation span comprising an elongated liquid distribution pipe running between a first support tower and a second support tower;

receiving sensor data from the sensor span, the sensor span comprising an elongated support running from between a third support tower and a fourth support tower;

determining a crop condition from the sensor data;

determining an amount of a first liquid that is suitable to produce a healthy crop in response to the crop condition; and outputting the amount of the first liquid to the field through the irrigation span.

17. The method of claim 16, further comprising:

determining an amount of a second liquid that is suitable to produce a healthy crop in response to the crop condition; and outputting the amount of the second liquid to the field through the sensor span.

18. The method of claim 17, wherein the second liquid is selected from the group comprising herbicide, fertilizer, fungicide, and insecticide.

19. The method of claim 16, further comprising receiving, through the sensor span, data from a soil sensor located in the field.

* * * * *